United States Patent
Gioutsos et al.

(10) Patent No.: US 6,867,690 B2
(45) Date of Patent: Mar. 15, 2005

(54) ACTIVE MAGNETOSTRICTIVE SENSOR FOR AUTOMOTIVE HORN OR OCCUPANT WEIGHT SENSOR

(75) Inventors: Tony Gioutsos, Novi, MI (US); Robert Janiszewski, Ann Arbor, MI (US); Steve Labadie, Southgate, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 114 days.

(21) Appl. No.: 10/066,988

(22) Filed: Feb. 4, 2002

(65) Prior Publication Data

US 2002/0126004 A1 Sep. 12, 2002

Related U.S. Application Data

(60) Provisional application No. 60/271,617, filed on Feb. 27, 2001.

(51) Int. Cl.⁷ .................................................. B60Q 1/00
(52) U.S. Cl. ................. 340/438; 340/388.1; 340/388.3; 340/393.3; 340/665; 340/666; 340/667; 200/61.54; 200/61.55; 200/61.56
(58) Field of Search ................................. 340/438, 436, 340/388.1, 384.1, 388.2, 388.3, 384.6, 391.1, 665, 666, 667, 393.1, 393.2, 393.3, 404.1; 200/61.54, 61.55, 61.56

(56) References Cited

U.S. PATENT DOCUMENTS

| | | | | |
|---|---|---|---|---|
| 4,191,944 A | * | 3/1980 | Frigo | 340/388.4 |
| 5,420,563 A | | 5/1995 | Frigo | 340/388.1 |
| 5,453,929 A | * | 9/1995 | Stove | 701/1 |
| 5,465,079 A | | 11/1995 | Bouchard et al. | 340/576 |
| 5,471,192 A | * | 11/1995 | Dash | 340/384.3 |
| 5,739,757 A | | 4/1998 | Gioutsos | |
| 5,767,766 A | * | 6/1998 | Kwun | 340/436 |
| 5,865,463 A | * | 2/1999 | Gagnon et al. | 280/735 |
| 5,894,264 A | * | 4/1999 | Zimmermann | 340/388.1 |
| 5,969,616 A | | 10/1999 | Tschoi | 340/576 |
| 6,203,059 B1 | * | 3/2001 | Mazur et al. | 280/735 |
| 6,218,947 B1 | | 4/2001 | Sutherland | 340/576 |
| 6,329,910 B1 | * | 12/2001 | Farrington | 340/436 |

* cited by examiner

*Primary Examiner*—Davetta W. Goins
(74) *Attorney, Agent, or Firm*—Lonnie Drayer; John Carlson (57) ABSTRACT

An improved force-measurement system utilizes active magnetostrictive sensors for generating a signal representative of a force, such as the weight of a person or thing on a seat within a motor vehicle, or the force applied to the horn sensor switch on a vehicle steering wheel. The active magnetostrictive sensor includes an excitation coil and a detection coil.

19 Claims, 7 Drawing Sheets

ACTIVE MAGNETOSTRICTIVE SENSOR FOR AUTOMOTIVE HORN OR OCCUPANT WEIGHT SENSOR

RELATED APPLICATIONS

This application claims priority to U.S. Provisional Application No. 60/271,617; filed on Feb. 27, 2001.

BACKGROUND OF THE INVENTION

The present invention relates to an improved system and method for activation of a vehicle horn or other vehicle functions and for detecting the weight of a person seated within a motor vehicle.

Current horn sensor designs have a large variability in force over the operating area of the sensor. In other words, the force needed to activate the horn may vary greatly between two different points on the horn sensor contact surface. Even at a given location on the horn sensor contact surface, the force required may also vary (e.g. two to seven pounds) over operating conditions, such as temperature, etc. Further, the sensitivity level of the sensor cannot be adjusted easily without significant time and expense for retooling.

Current vehicles include an airbag for the driver as well as the front seat passenger. The danger that the passenger side airbag poses to infants in car seats and small children as well as small adults has been well documented. Manufacturers have sought to develop systems that would disable the passenger side airbag if the weight on the passenger seat is below a given threshold, thereby indicating either the presence of an individual for whom the airbag would be dangerous or the absence of any passenger at all.

One known system, described and claimed in U.S. Pat. No. 5,739,757, entitled "Vehicle Passenger Weight Sensor," the assignee of which is the assignee of the present invention, uses a magnetostrictive sensor to measure strain on a wires under the cushion of the seat to determine the weight of a person or thing seated. However, this design may not always measure all of the weight on the seat, which may not be transmitted to the wires under the cushion, depending upon the position of the passenger.

SUMMARY OF THE INVENTION

The present invention provides an improved system and method for generating a signal representative of a force, such as the weight of a person or thing on a seat within a motor vehicle, or the force applied to a switch on a vehicle steering wheel.

The present invention provides a force measurement system utilizing active magnetostrictive sensors. The active magnetostrictive sensor includes an excitation coil and a detection coil. The excitation coil converts an electrical AC input signal into an acoustic wave by the magnetostrictive principle. The signal is AC to allow for a changing current through the coil, which when wrapped around a ferrite material creates an electromagnet. The acoustic wave travels through the ferromagnetic sensing material. The acoustic signal passing through the ferrite core creates an electrical current in the detection coil. When stress is applied to the sensing material, the acoustic wave is affected and the detection coil monitors this change. The change can be measured by measuring voltage or current. These methods require a constant excitation voltage/current. This change in the current/voltage, as measured from the detection coil, has a linear relationship to the amount of force applied on the sensing material. The sensor operates in a linear fashion as long as some force or "preload" is used to get the operating point away from the non-linear region. Preferably a pre-load is used in the present invention.

The present invention provides a system for generating a signal representative of the weight of a person or thing seated within a motor vehicle includes at least one ferromagnetic element mechanically coupled between the structure of a seat and the vehicle floor, such that an elastic strain is induced therein responsive to all of the mechanical loading of the seat by the person or thing seated thereupon. Preferably, a ferromagnetic element is mounted directly between each seat bracket and the vehicle floor, in order to sense all of the weight on the seat. The strain in each element is detected and measured by the detection coil, as described above.

The present invention further provides a system for activating a horn. The ferromagnetic element is coupled to a contact surface, which is activated by a user desiring to activate the horn. The force exerted by the user on the contact surface is measured by analyzing the signal (voltage and/or current) received by the detection coil. If a predetermined change is detected by the associated electronics, the system activates the horn. This system provides a more constant force requirement across the area of the contact surface and under different operating conditions, such as temperature. Further, because the threshold can be adjusted in the electronics or software, the force required to activate the horn can be easily changed, such as for different vehicles or for user preference.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which:

FIG. 4a illustrates one possible arrangement of the force sensor of the present invention as a horn activation switch;

FIG. 4b illustrates another arrangement of a horn activation switch, similar to FIG. 4a;

FIG. 4c is a third possible arrangement of the horn activation switch of FIG. 4a;

FIG. 4d is a fourth possible arrangement for the horn activation switch of FIG. 4a;

DETAILED DESCRIPTION OF THE PREFERRED EMBODIMENT

Figure 1:
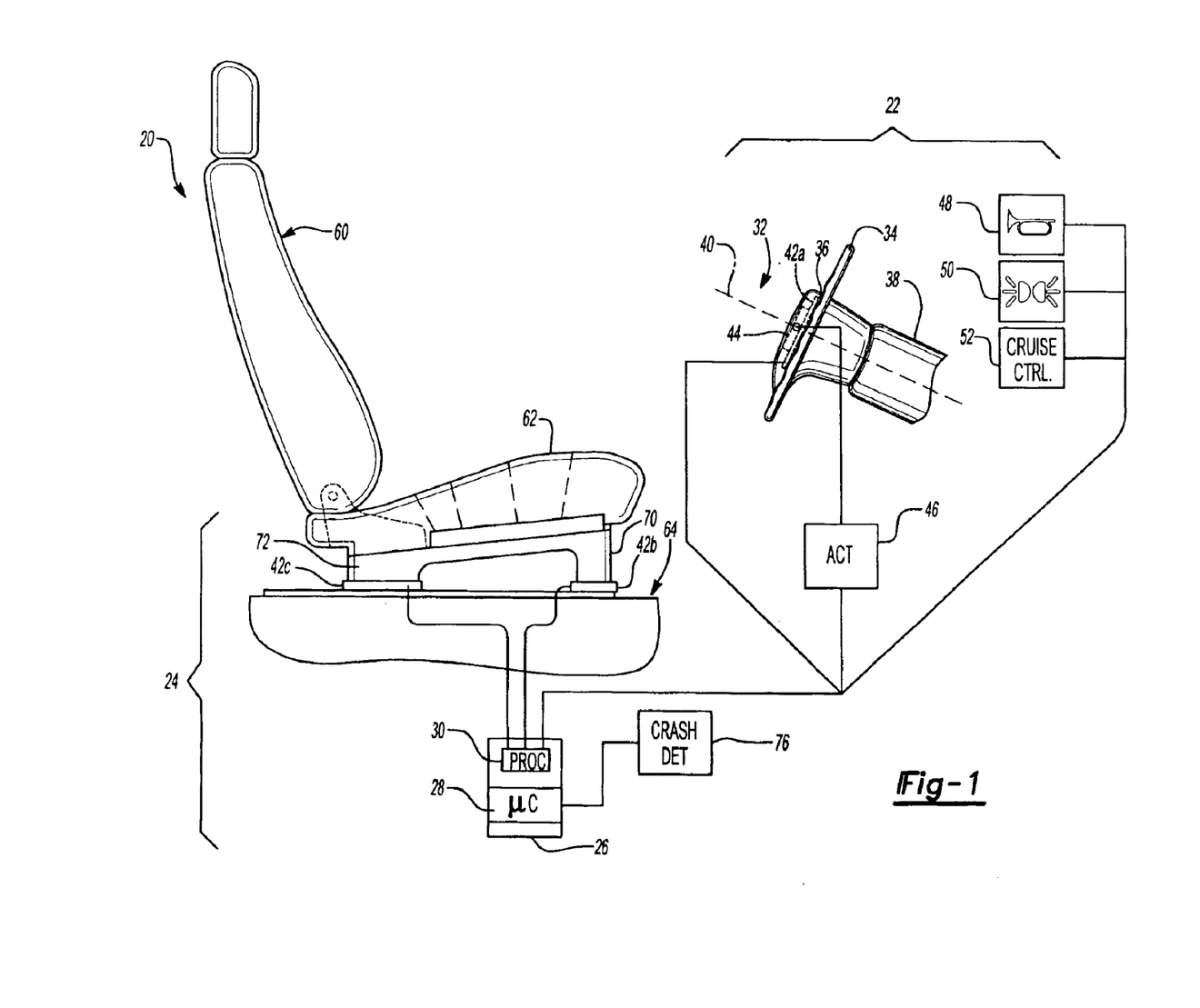
FIG. 1 is a schematic of the force sensor system of the present invention implemented as a steering wheel switch and weight sensor.

The present invention provides a force sensing system 20 implemented here as a user activated switching system 22 and occupant weight sensing system 24 both utilizing a controller 26. The controller 26 includes a microprocessor 28 (including associated memory, storage, RAM, etc.) and any necessary signal processor 30, such as amplifiers, filters, analog to digital converters, etc. It should be noted that signal processing could be provided by the microprocessor 28 in a known manner. Generally, the user activated switching system 22 activates vehicle functions when selected by a user, while occupant weight sensing system 24 determines the presence, weight and/or position of an occupant in the vehicle.

The user activated switching system 22 is illustrated as installed on a vehicle steering wheel 32 because this location benefits greatly from the present invention, although it should be recognized that the switching system 22 could also be utilized in other locations in the vehicle. The steering wheel 32 generally includes the steering rim 34 connected to the base or hub 36, which is mounted on steering column 38 and rotatable about its center line 40. The present invention provides a force sensor 42a mounted on hub 36, which is preferably for activation of a vehicle horn, but could be used for other vehicle functions as will be described below. The force sensor 42a is preferably mounted behind the air bag module 44 as shown, but may also be mounted in front of air bag module 44. As is known, the air bag module 44 is selectively activated by air bag actuator 46, as determined by the controller 26. The controller 26 also controls other vehicle functions, such as the vehicle horn 48, headlights 50 and cruise control 52, based on activation of the force sensor 42a.

In the user activated switching system 22, the force sensor 42a senses force imparted by the user upon the force sensor 42a, either directly or through airbag module 44 positioned in front of force sensor 42a. In response, the controller 26 activates the horn 48 or other vehicle functions, such as headlight 50 or cruise control 52.

In the event of a crash, the controller 26 also selectively activates the air bag module 44 based upon inputs from the force sensors 42b and 42c (among other data inputs), which sense the weight of an occupant seated in vehicle seat 60. Preferably, force sensors 42b,c sense all of the weight between the seating surface 62 of vehicle seat 60 and the vehicle floor 64. In this example, the force sensors 42b,c are installed between vehicle seat 60 brackets 72 and the vehicle floor 64. It should be noted that the vehicle 60 in this example includes four brackets (two shown) and that sensors (two shown) would be installed between all of the brackets and the vehicle floor 64. The force sensed by each of the sensors 42b,c can be summed to determine the total weight upon seating surface 62. Alternatively, or addition, the controller 26 can determine whether occupant is seated toward the front of the seat, in the middle of the seat, toward the left or right of the seat 68, or whether there is no occupant in the seat 60.

Utilizing known algorithm and rules, the controller 26 determines the occurrence of a crash, from crash detection sensor 76 (such as an accelerometer or ball and tube sensor). The controller 26 then determines whether to fire airbag module 44 based upon the severity or type of crash and based upon information from the sensors 42b,c. For example, if the controller 26 determines from sensors 42b,c that there is no occupant in seat 60, the controller 26 does not activate airbag module 44. Further, if the weight on seating surface 62 is determined to be insufficient (the occupant may be a child) the controller 26 does not activate air bag module 44. Further, for a multistage airbag module 44, the controller 26 may determine which stages of air bag module 44 to activate, for more or less force, based upon the information from sensors 42b,c.

Figure 2:
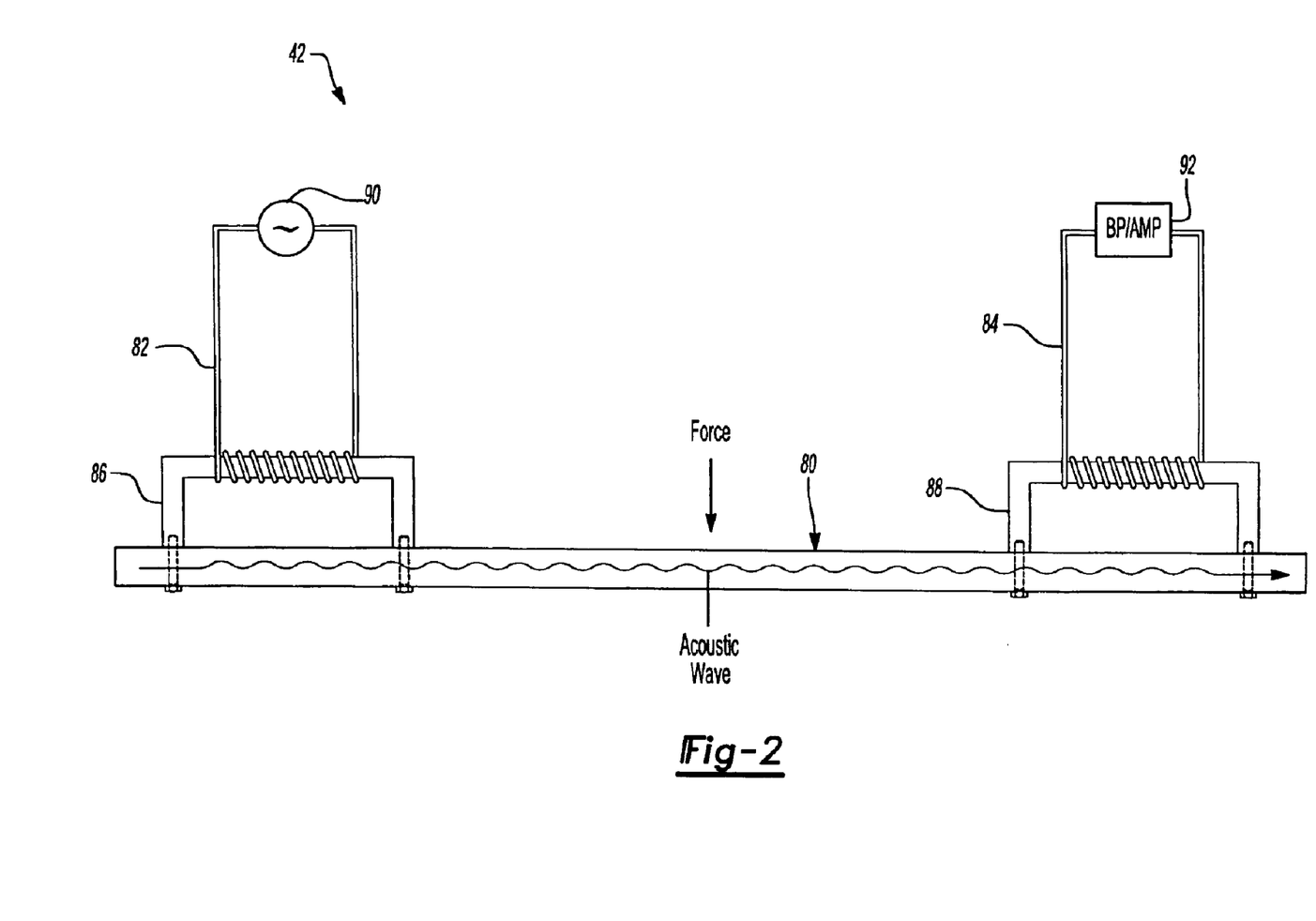
FIG. 2 schematically illustrates an active force sensor according to the present invention.

FIG. 2 schematically illustrates a force sensor 42 which could be utilized as the force sensors 42a,b and c of FIG. 1. As shown in FIG. 2, the force sensor 42 generally includes ferromagnetic sensing material 80, which receives the force to be measured (e.g. the force from the user to activate the user activated switch or the force from the weight of the occupant). The force sensor 42 further includes an excitation coil 82 and detection coil 84 each preferably wrapped about a ferrite core 86, 88 respectively. The ferrite cores 86, 88 are preferably abutting, adjacent the ferromagnetic sensing material 80 (or actually comprise the ferromagnetic sensing material 80, as described in other embodiments below). The function generator, preferably an AC sine wave generator 90 sends an excitation signal to the excitation coil 82. A bandpass filter/amplifier 92 is connected the detection coil 84. Function generator 90 and bandpass filter/amplifier 92 are preferably part of the signal processor 30 of FIG. 1.

The excitation coil 82 converts the electrical AC input signal onto an acoustic wave by the magnetostrictive principal. The acoustic wave travels through the ferromagnetic sensing material 80 and the ferrite core 88 of detection coil 84, which in turn creates an electrical current in the detection coil 84. When force or stress is applied to the ferromagnetic sensing material 80, the acoustic wave is affected by the change in strain in the material 80, as is the electrical current in the detection coil 84. The current (or voltage) is measured to determine the change. The frequency and amplitude of the signals and the number of turns in the coils 82, 84 will depend upon the particular application, as well the materials of the cores 86, 88 and the thickness, texture and shape of the ferromagnetic sensing material 80. One of ordinary skilled in the art would be able to determine suitable parameters for a given design.

Figure 3:
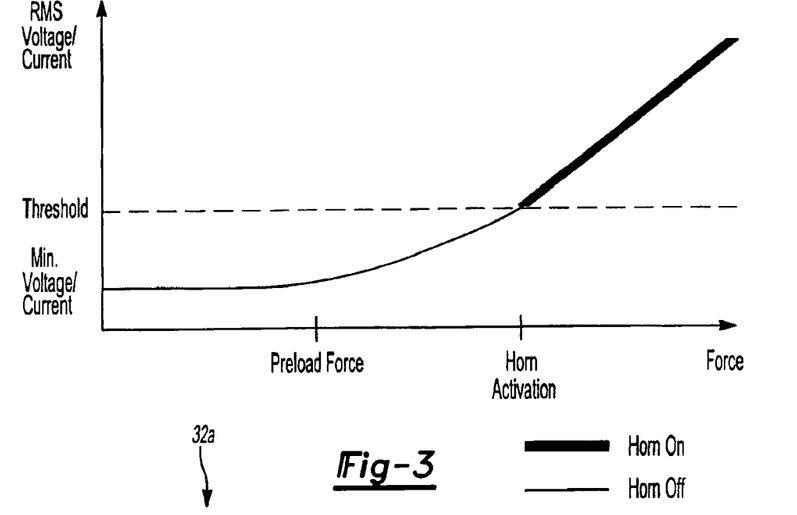
FIG. 3 is a graph illustrating the operation of the force sensor of FIG. 2.

FIG. 3 illustrates the RMS voltage output from the force sensor 42 in FIG. 2 for a given force. Preferably, the ferromagnetic sensing material 80 (FIG. 2) is mechanically preloaded so that the output verses force input is in the linear region. The threshold shown in FIG. 3 could be for activation of the horn or other vehicle functions for the user activated switching system 22 of FIG. 1. It should also be noted that the threshold can be easily changed by simply changing a software in the controller 26 thus, the sensor 42 can used for various applications and in different vehicle and can be easily configured to activate at the proper threshold.

Figures 4A, 4B:
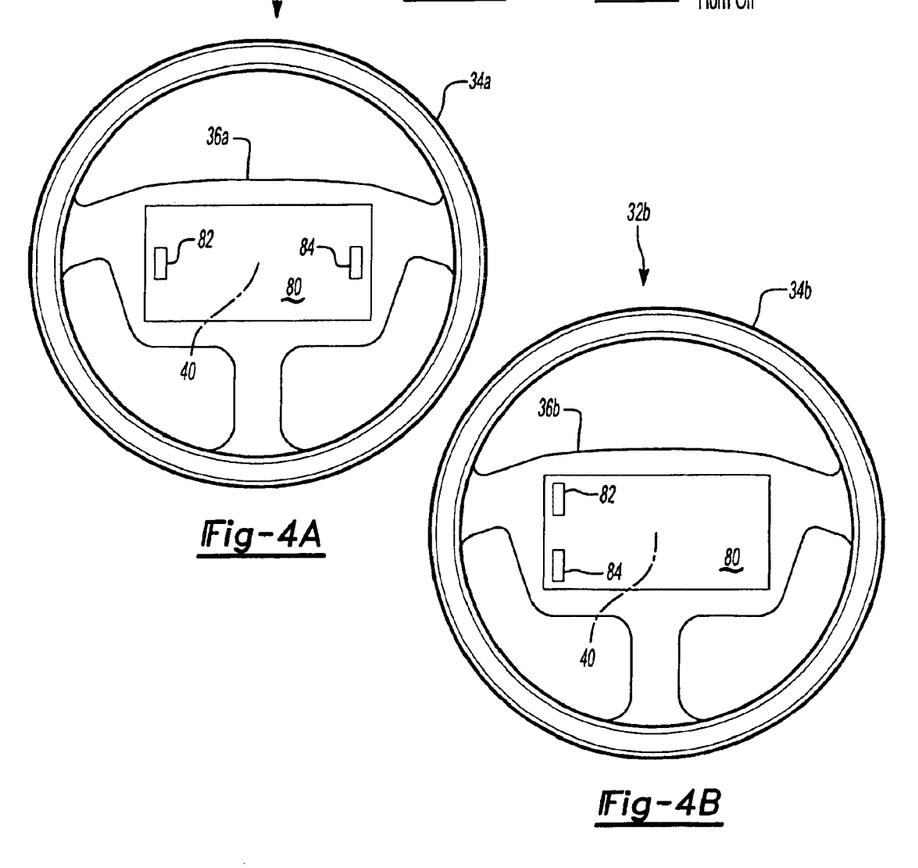
Figure 4C:
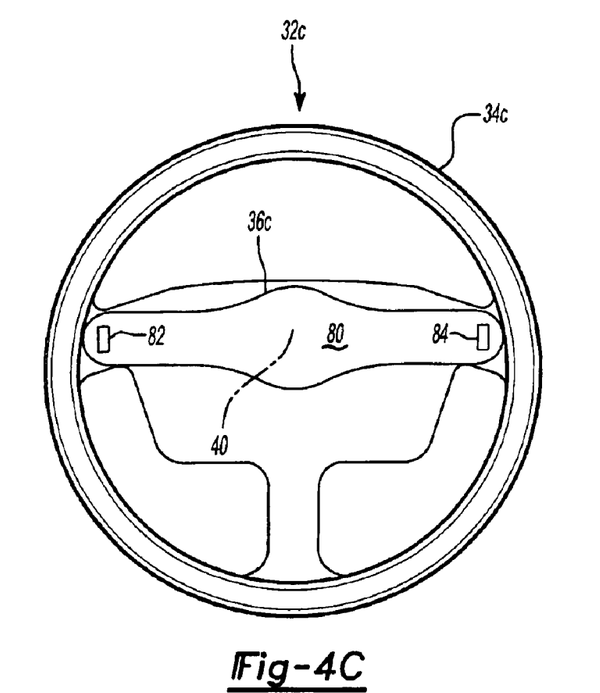

FIGS. 4a–f illustrate possible configurations of the force sensor 42a on a steering wheel 32a–f each comprising a steering rim 34a–f and hub 36a–f, respectively. In FIG. 4a, the excitation coil 82 and detection coil 84 are positioned at opposite ends of ferromagnetic sensing material 80 on opposite sides of the center line 40 of the steering wheel 32a. Alternatively, as shown in FIG. 4b, the excitation coil 82 and detection coil 84 can both be on the same side of the center line 40 of the ferromagnetic sensing material 80 in order to simplify the connection to the controller 26 (FIG. 1). Of course, the excitation and detection coils 82, 84 could also be installed on different shaped hubs, as is shown in FIG. 4c.

Figure 4D:
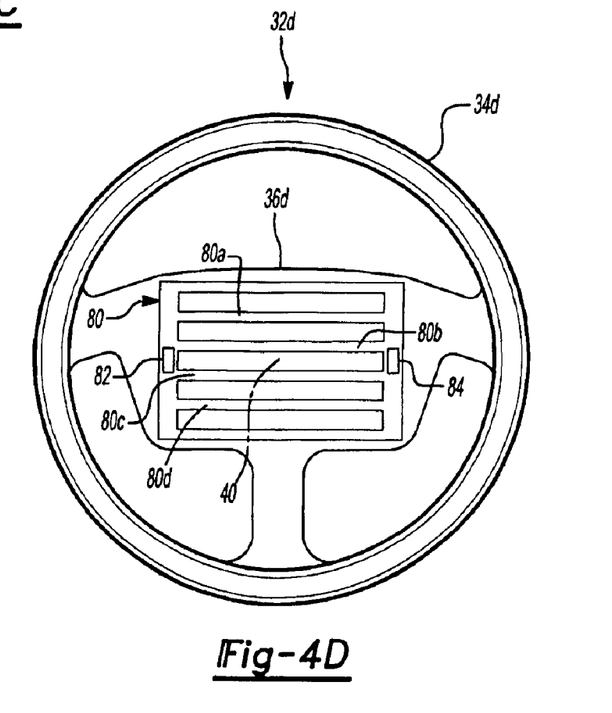

FIG. 4d illustrates an embodiment where multiple strips 80a–d are formed in the ferromagnetic sensing material (by cutout sections between the strips 80a–d). In this embodiment, the force on the strip 80a can be distinguished from force on strip 80b, c and/or d. Force on any one of the strips 80a–d will cause different changes in the signal received at detection coil 84, which can be discerned by the controller 26 (FIG. 1). Varying the distances, widths, thicknesses, stiffnesses, textures, or other changes among the strips 80*a–d* will make it easier to discern activation of the different strips 80*a–d*. In this manner, each of the strips 80*a–d* can be programmed to operate a different vehicle function, for example the vehicle horn 48 could be activated by force on strip 80*a*, head lights 50 by force on strip 80*b* and cruise control 52 by forces on strips 80*c–d*. (FIG. 1). It should be noted that the embodiment of FIG. 4*d* would preferably be installed in front of an air bag module.

Figure 4E:
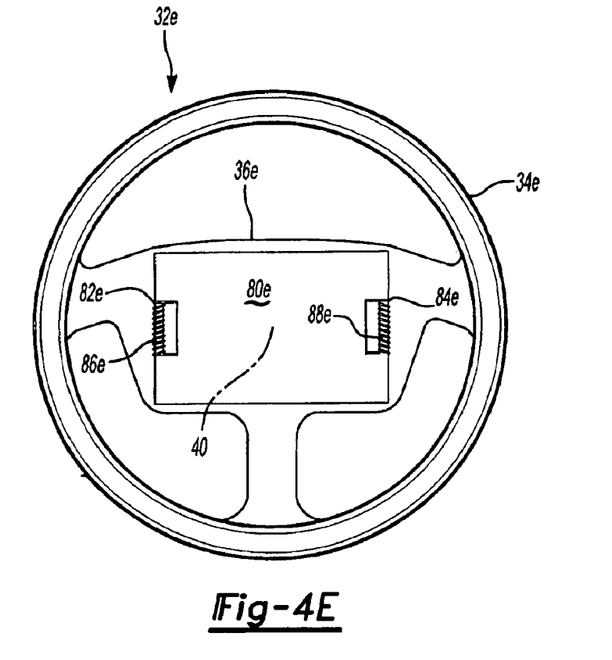
FIG. 4E illustrates a fifth possible arrangement for the horn activation switch of FIG. 4A.

FIG. 4*e* illustrates an alternate embodiment of a steering wheel 32*e* wherein the excitation coil 80*e* and the detection coil 84*e* are coiled about portions of the ferromagnetic sensing material 80*e* which constitute the ferrite cores 86*e* and 88*e*, respectively. In other words, in this embodiment, a separate ferrite core is eliminated and a portion of the ferromagnetic sensing material 80*e* is used as the ferrite core. It should be recognized that this could be implemented in any of the arrangements shown in FIGS. 4*a–d*, as well. This reduces the complexity and cost of the design.

Figure 4F:
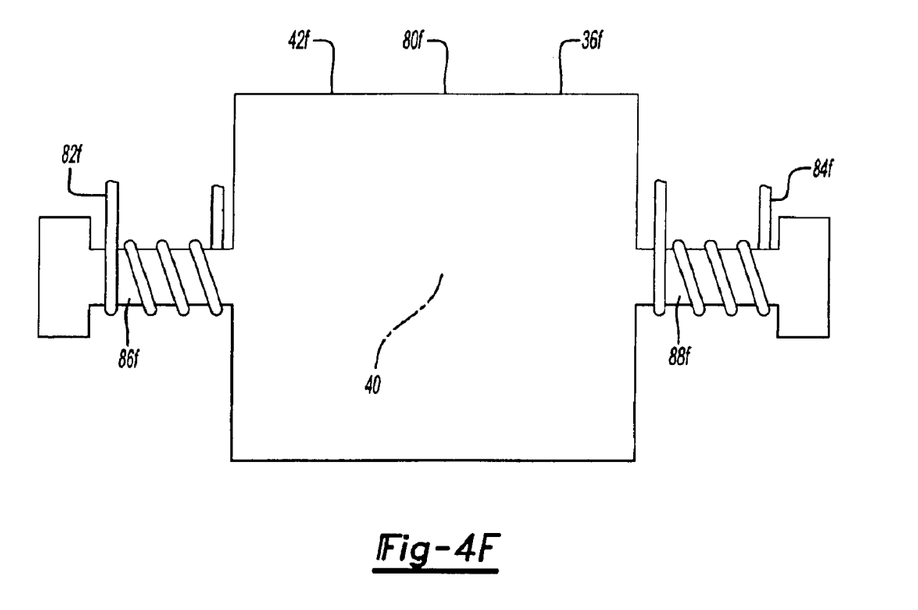
FIG. 4F illustrates a sixth possible arrangement for the horn activation switch for FIG. 4A.

FIG. 4*f* illustrates an alternate design for a sensor 40*f* including ferromagnetic sensing material 80*f* mounted on hub portion 36*f* of the steering wheel (not shown). Again, a portion of the ferromagnetic sensing material 80*f* is used to form ferrite cores 86*f*, 88*f* about which the excitation coil 82*f* and detection coil 84*f*, respectively, are coiled. The sensor 40*f* could be used in the designs of FIGS. 4*a–e*.

Figure 5A:
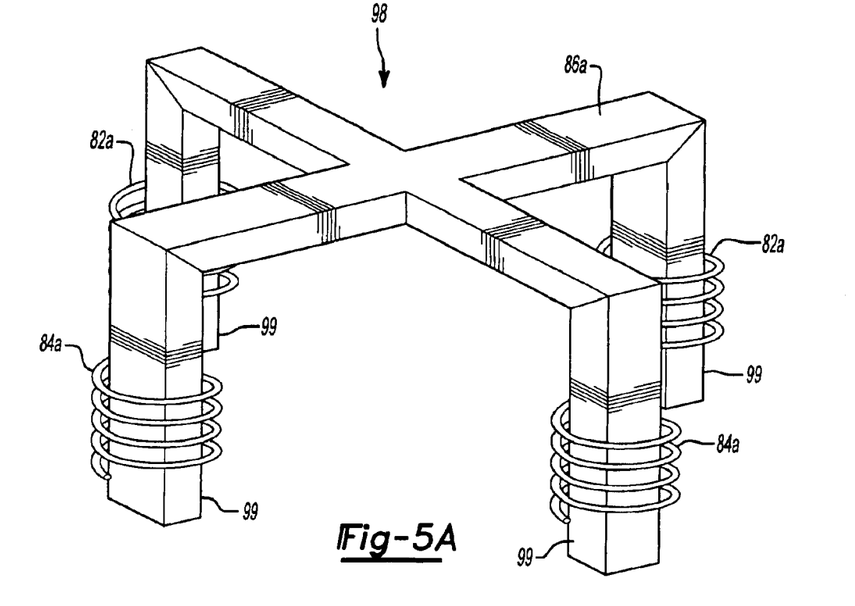
FIG. 5A is an alternate embodiment of the magnetostrictive sensor of FIG. 2.

FIG. 5A illustrates an alternate magnetostrictive sensor 98 including an alternate ferrite core 86*a*, which could be utilized for the excitation coil 82*a* and detection coil 84*a*. The alternative ferrite core 86*a* generally comprises a cross having four posts 99 extending perpendicularly from ends of the cross. The coils 82*a,b* are coiled about the perpendicular posts 99. This sensor 98 could be used in the sensor designs of FIGS. 4*a–d*.

Figure 5B:
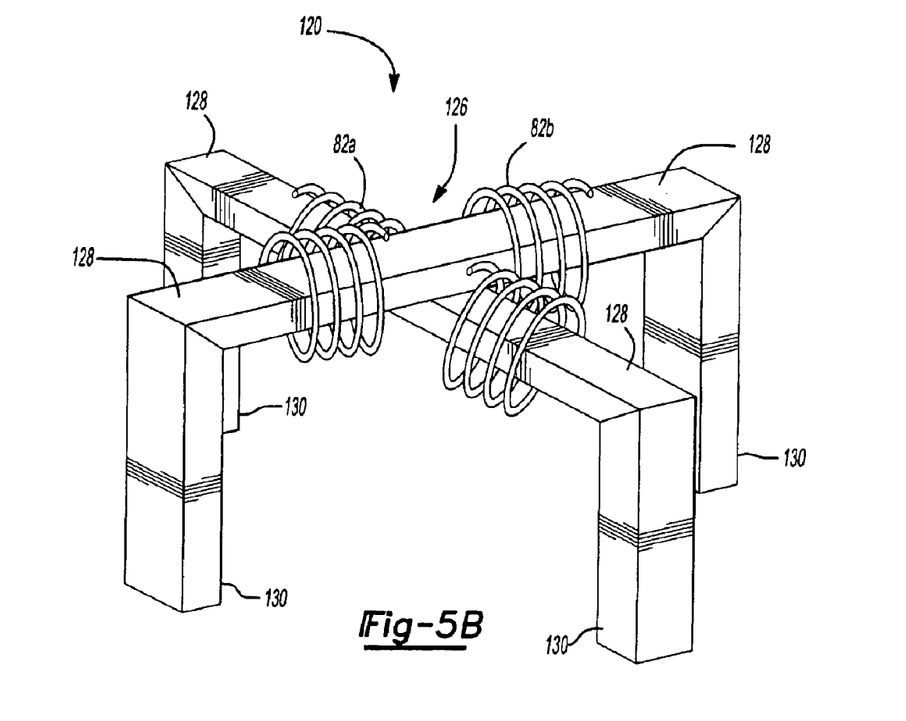
FIG. 5B is alternate embodiment of the magnetostrictive sensor of FIG. 5A.

FIG. 5B illustrates an alternate magnetostrictive sensor 120 of the sensor 98 of FIG. 5A. The ferrite core 126 comprises two u-shaped members 126, each having a crossbar 128 and two perpendicular posts 130. The coils 82*a, b* are coiled about the cross-bars 128. The cross-bar 128 of one u-shaped member 126 is positioned adjacent the cross-bar 128 of the other u-shaped member. This sensor 120 is easier to manufacture and could also be used in the sensor designs of FIGS. 4*a–d*.

Figure 6:
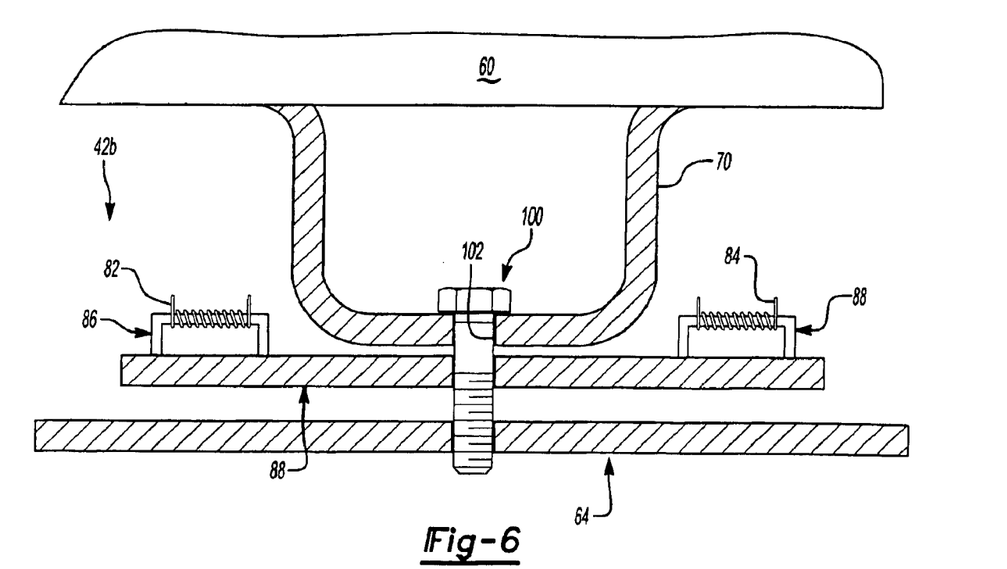
FIG. 6 is a more detailed view of the weight sensor of FIG. 1.
Figure 7:
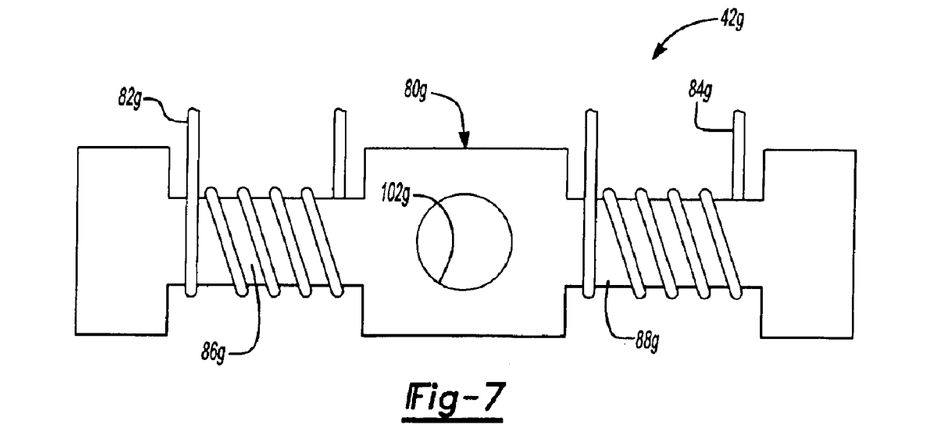
FIG. 7 is an alternate embodiment of the force sensor of FIG. 6.

FIG. 6 is an enlarged view of the weight sensor 42*b* of FIG. 1 (weight sensor 42*c* would be identical). As shown in FIG. 6, the ferromagnetic sensing material 88 is mounted between the bracket 70 of the vehicle seat 60 and the vehicle floor 64, such that all of the weight on the seat 60 passing through the bracket to the floor 64 passes through the ferromagnetic sensing material 88. A fastener, such as a bolt 100, connects the bracket 70 to the vehicle floor 64, passing through an aperture 102 in the ferromagnetic sensing material 88. The excitation coil 82 and its ferrite core 86 may be positioned on one side of bolt 100, while detection coil 84 and its ferrite core 88 are on the opposite side. Alternatively, different arrangements could be utilized. For example, FIG. 7 illustrates an alternate sensor 42*g* which could be utilized in place of the sensor 42*b* of FIG. 6. In FIG. 7, the ferromagnetic sensing material 80F (including aperture 102*g*) has portions 86*g*, 88*g*, which form the ferrite cores for excitation coil 82*g* and detection coil 84*g*, respectfully. Again, integrating the ferrite core in the ferromagnetic sensing material 80*f* reduces the number of parts and simplifies the design. This sensor design could also be used in the horn switch applications by designing the armature to fit into the sensor.

All of the embodiments of the user activate switching system 22 (FIG. 1) of the present invention offers three main benefits over current switch designs. The switches of the present invention will have relatively constant force thresholds over changes in operating conditions, such as temperature. Further, different locations on the steering wheel will also have a relatively constant force threshold, unlike current horn activation switches. Further, the sensitivity level can be easily adjusted by a change in software and controller (or change in circuitry in signal processor 30).

The vehicle occupant weight sensing system 24 of the present invention measures all of the weight upon the seating surface 62, because sensors 42*b,c* are installed between the seat 60 and vehicle floor 64. The change in height of the seat is minimal, since it only the height of the ferromagnetic sensing material 80, which can be minimal. The electronics for this system, controller 26, is shared among the sensors 40*b,c*.

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. For example, any of the pairs of excitation coil 82 and detection coil 84 could be replaced with a single coil that alternates as an excitation coil and detection coil.

What is claimed is:

1. A vehicle horn activation system comprising:
   b. an activation surface for receiving contact by a user to activate a horn;
   c. a ferromagnetic element mechanically coupled to the activation surface;
   d. a magnetostrictive sensor coupled to the ferromagnetic element and generating a signal based upon stress in the ferromagnetic element caused by contact on the activation surface; and
   e. a horn switch activated based upon the signal from the magnetostrictive sensor.

2. The vehicle horn activation system of claim 1 further including a horn activated based upon the activation of the horn switch.

3. The vehicle horn activation system of claim 1 wherein the magnetostrictive sensor further includes an excitation coil generating an acoustic wave in the ferromagnetic element.

4. The vehicle horn activation system of claim 3 wherein the magnetostrictive sensor further includes a detection coil generating an electrical current based upon the acoustic wave in the ferromagnetic element.

5. The vehicle horn activation system of claim 4 further including a steering wheel, said ferromagnetic element mounted on said steering wheel.

6. The vehicle horn activation system of claim 5 wherein the steering wheel comprises a base generally circumscribed by a steering rim and having a centerpoint about which said steering wheel is rotatable, said ferromagnetic element mounted on said base.

7. The vehicle horn activation system of claim 6 wherein said excitation coil and said detection coil are mounted generally on opposite sides of said centerpoint.

8. The vehicle horn activation system of claim 6 wherein said excitation coil and said detection coil are mounted generally on the same side of said centerpoint.

9. The vehicle horn activation system of claim 5 wherein said ferromagnetic element is generally planar and at least one of said detection coil and said excitation coil are coiled around at least a portion of said ferromagnetic element.

10. The vehicle horn activation system of claim 9 wherein each of said detection coil and said excitation coil are coiled around at least a portion of said ferromagnetic element.

11. The vehicle horn activation system of claim 4 wherein said detection coil and said excitation coil are both coiled around a single ferrite core.

12. A vehicle switching system comprising:
   a. a first activation surface for receiving force by a user to activate a vehicle horn;
   b. a ferromagnetic element including a first portion mechanically coupled to said first activation surface; and
   c. a magnetostrictive sensor coupled to the activation surface and generating a first signal based upon force applied to the first activation surface, said first signal activating said vehicle horn.

13. The vehicle switching system of claim 12 wherein said ferromagnetic element further includes a second portion mechanically coupled to a second contact surface, said magnetostrictive sensor generating a second signal based upon force applied to said second contact surface, said second signal activating a vehicle function different from said vehicle horn.

14. The vehicle switching system of claim 13 wherein the magnetostrictive sensor further includes an excitation coil generating an acoustic wave in the ferromagnetic element.

15. The vehicle switching system of claim 14 wherein the magnetostrictive sensor further includes a detection coil generating an electrical current based upon the acoustic wave in the ferromagnetic element.

16. The vehicle switching system of claim 14 further including a steering wheel, said ferromagnetic element mounted on said steering wheel.

17. The vehicle switching system of claim 12 further including a second ferromagnetic portion coupled to a second activation surface, said magnetostrictive sensor generating a second signal based upon force applied to said second contact surface, said second signal generating a vehicle function different from said vehicle horn.

18. The vehicle switching system of claim 17 wherein the magnetostrictive sensor includes an excitation coil and a detection coil generating said first and second signals.

19. The vehicle switching system of claim 17 further including a ferromagnetic element comprising the first and second ferromagnetic portions.

* * * * *